(12) United States Patent
Kitagawa et al.

(10) Patent No.: US 6,404,469 B1
(45) Date of Patent: Jun. 11, 2002

(54) WIDE VIEWING ANGLE POLARIZING PLATE AND LIQUID CRYSTAL DISPLAY

(75) Inventors: Atsushi Kitagawa; Yuuji Saiki; Masayuki Satake; Hiroyuki Yoshimi, all of Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/990,220

(22) Filed: Nov. 20, 2001

(51) Int. Cl.[7] ............................................. G02F 1/1335
(52) U.S. Cl. ....................................................... 349/96
(58) Field of Search ............................................ 349/96

(56) References Cited

U.S. PATENT DOCUMENTS 5,795,650 A * 8/1998 Watanabe et al. ........... 428/355
6,097,455 A * 8/2000 Babuka et al. ................ 349/73
6,074,729 A * 12/2000 Watanabe et al. ........... 428/212
6,331,882 B1 * 12/2001 Shimodaira et al. ........ 349/122

FOREIGN PATENT DOCUMENTS

JP    2000-321426    11/2000

* cited by examiner

*Primary Examiner*—James Dudek

(57) ABSTRACT

A wide viewing angle polarizing plate capable of forming a liquid crystal display which causes less brightness unevenness by heat history, thereby exhibiting good visibility at a wide viewing angle, comprises a polarizing plate in which a transparent protective layer made of an compensating plate is provided on at least one surface of a polarizing film, one or both of a brightness enhanced plate and a retardation plate laminated on the polarizing plate via an adhesive layer, have a 1000% modulus at 90° C. of at most 6 g/mm$^2$, thereby to form a laminate, and an adhesive layer disposed on one surface or on both surfaces of the outer surface of the laminate.

10 Claims, 1 Drawing Sheet

WIDE VIEWING ANGLE POLARIZING PLATE AND LIQUID CRYSTAL DISPLAY

BACKGROUND OF THE INVENTION

1. Field of the Invention

The present invention relates to a wide viewing angle polarizing plate capable of forming a liquid crystal display which causes less brightness unevenness by heat history, thereby exhibiting good visibility in a wide viewing angle range.

2. Description of the Background Art

Hitherto, a wide viewing angle polarizing plate has been known in which a compensating plate obtained by supporting a compensating layer with a cellulose triacetate film is bonded as a transparent protective layer of a polarizing film. Such a wide viewing angle polarizing plate is applied to a liquid crystal cell to form a liquid crystal display (LCD) exhibiting a good visibility at a wide viewing angle. Since it is a key device of an LCD, it is used in a state in which an adhesive layer made of an acryl series adhesive or the like for bonding it to the liquid crystal cell is attached in advance for the purpose of preventing the variation of quality and providing a more efficient assembling process, and in which a brightness enhanced plate or a retardation plate is laminated via an adhesive layer for the purpose of improving the brightness and further adjusting the retardation.

However, when such a wide viewing angle polarizing plate is bonded onto a liquid crystal cell via an adhesive layer and heated, it causes a problem of generation of brightness unevenness. This brightness unevenness typically appears in a window frame shape, and increases further when a brightness enhanced plate or a retardation plate is laminated.

SUMMARY OF THE INVENTION

Thus, an object of the present invention is develop a wide viewing angle polarizing plate capable of forming a liquid crystal display which causes less brightness unevenness by heat history, thereby exhibiting good visibility at a wide viewing angle.

The present invention provides a wide viewing angle polarizing plate comprising a polarizing plate in which a transparent protective layer made of an compensating plate is provided on at least one surface of a polarizing film; one or both of a brightness enhanced plate and a retardation plate laminated on the polarizing plate via an adhesive layer thereby to form a laminate; and an adhesive layer disposed on one surface or on both surfaces of an outer surface of the laminate, wherein the adhesive layers all have a 1000% modulus at 90° C. of at most 6 g/mm².

The present invention in the above-mentioned wide viewing angle polarizing plate, the compensating plate is a liquid crystal layer supported by a film.

The present invention in the above-mentioned wide viewing angle polarizing plate, the polarizing plate is provided in such a manner as to be disposed between the brightness enhanced plate and the adhesive layer on the outer surface.

The present invention in the above-mentioned wide viewing angle polarizing plate, the retardation plate is provided in such a manner as to be disposed between the polarizing plate and the adhesive layer on the outer surface.

The present invention in the above-mentioned wide viewing angle polarizing plate, the adhesive layer provided on the outer surface of the laminate has a larger thickness than the adhesive layer disposed inside the laminate.

Also, the present invention provides a liquid crystal display having the above-mentioned wide viewing angle polarizing plate on at least one side of a liquid crystal cell.

The inventors of the present invention repeatedly made eager studies in order to solve the aforementioned problem of brightness unevenness, and found out that such generation of brightness unevenness is caused by change in retardation and the residual of this state owing to generation of stress brought about by contraction or the like of the compensating plate or the like when it is heated. By bonding via the aforesaid adhesive layer, the stress generated at the time of heating can be relaxed, and the generation of brightness unevenness can be prevented. With the use of this wide viewing angle polarizing plate, a high-quality and good-durability liquid crystal display having a good visibility and being excellent in viewing angle can be obtained.

DESCRIPTION OF THE PREFERRED EMBODIMENTS

Figure 1:
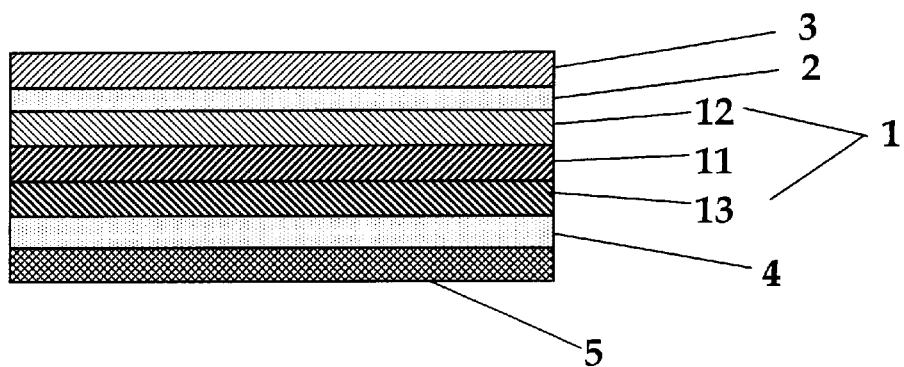
FIG. 1 across-sectional view illustrating one embodiment of the present invention and FIG. 2 is a cross-sectional view illustrating another embodiment of the present invention.
Figure 2:
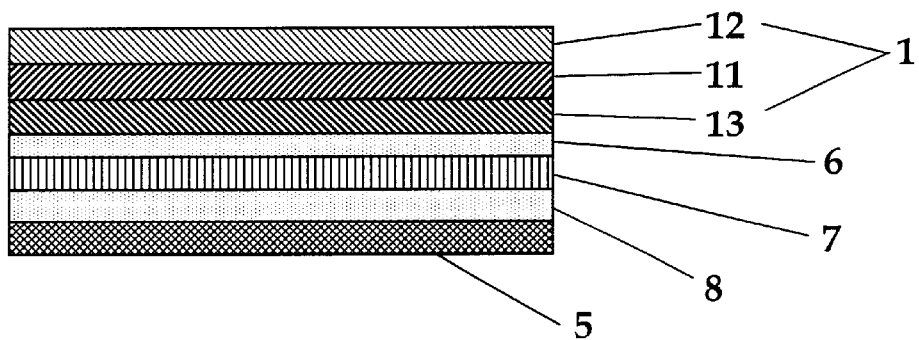

A wide viewing angle polarizing plate according to the present invention comprises a polarizing plate in which a transparent protective layer made of an compensating plate is provided on at least one surface of a polarizing film; one or both of a brightness enhanced plate and a retardation plate laminated on the polarizing plate via an adhesive layer thereby to form a laminate; and an adhesive layer disposed on one surface or on both surfaces of an outer surface of the laminate, wherein the adhesive layers all have a 1000% modulus at 90° C. of at most 6 g/mm². Examples of this wide viewing angle polarizing plate are shown in FIGS. 1 and 2, where a polarizing plate 1, its polarizing film 11, transparent protective layers 12, 13, adhesive layers 2, 4, 6, 8, a brightness enhanced plate 3, and a retardation plate 7 are shown. And the transparent protective layer 13 is a compensating plate, and a separator 5.

The aforesaid polarizing film may be made of a suitable material, and the type of the polarizing film is not specifically limited. Examples of the polarizing film include those obtained by allowing a dichroic substance such as iodine or a dye to be adsorbed onto a hydrophilic polymer film such as a polyvinyl alcohol series film, partially formalized polyvinyl alcohol series film, ethylene/vinyl acetate copolymer series partially saponified film, or cellulose series film and stretching the film; or a polyene oriented film such as a dehydrated product of polyvinyl alcohol or a dehydrochlorinated product of polyvinyl chloride. The polarizing film typically has a thickness of from 5 to 80 μm, but the thickness is not limited to this range.

The polarizing plate of the present invention is constructed in such a manner that a transparent protective layer made of a compensating plate is provided on at least one surface of the polarizing film. The compensating plate may be a suitable one for the purpose of preventing coloring due to change in the viewing angle based on the retardation by a liquid crystal cell or enlarging the viewing angle with a good visibility.

An example thereof is a retardation film (NRF, NRZ, and others manufactured by NITTO DENKO CORPORATION) obtained by stretching a film made of a suitable polymer such as cellulose triacetate, polycarbonate, norbornene series resin, polyester, polysulfone, polystyrene, polymethyl methacrylate, polyvinyl alcohol, polyolefin such as polypropylene, polyallylate, or polyamide, by a suitable method such as monoaxial or biaxial stretching.

Also, those in which an compensating layer is supported with a film made of the aforesaid polymer, particularly those in which a compensating layer made of an oriented layer of liquid crystal polymer or the like, in particular an inclined orientation layer of a discotic or nematic series liquid crystal polymer, is supported with a cellulose triacetate film or the like WVA02A and others manufactured by Fuji Photo Film Co., Ltd.) and the like can be mentioned as examples of the aforesaid compensating plate. The compensating plate to be used in the present invention may be those in which two or more layers of the aforesaid retardation film or the film supporter are superposed one upon another to control optical characteristics such as retardation.

The transparent protective layer may be provided on one surface or on both surfaces of the polarizing film. When the transparent protective layer is provided on both surfaces of the polarizing film, both may be made of an compensating plate, or alternatively, one may be made of a compensating plate and the other may be made of a conventional one.

The aforesaid conventional transparent protective layer may be made, for example, of plastics such as a cellulose series resin such as cellulose triacetate, polyester, polycarbonate, polyamide, polyimide, polyethersulfone, polysulfone, polystyrene, or acrylic resin, polyolefin, or thermosetting or ultraviolet-curing resin such as acryl series, urethane series, acrylurethane series, epoxy series, or silicone series, or the like. A preferable transparent protective layer is excellent in transparency, mechanical strength, thermal stability, moisture shielding property, isotropic property, and others.

The transparent protective layer may be formed by a suitable method such as coating a polymer or laminating a film or the aforesaid compensating plate. The thickness of the transparent protective layer may be suitably determined in accordance with the retardation, protective strength, and the like. Typically, the thickness is at most 5 mm, preferably at most 1 mm, more preferably from 1 to 500 $\mu$m.

The process of bonding the polarizing film and the transparent protective film, particularly the compensating plate, can be carried out using a suitable method. Typically, the bonding process is carried out using an adhesive such as a tacky agent. In particular, if the polarizing film is made of a polyvinyl alcohol series film, a polyvinyl alcohol series adhesive can be preferably used in view of stability in the bonding process.

In the above, the polarizing plate may be formed as a diffusing type, a reflecting type, or the like. The diffusing type polarizing plate is used for enlarging the viewing angle by diffusing the display light or for preventing glaring by diffusing the surface-reflected light of external light. The diffusing type polarizing plate can be formed, for example, by allowing fine particles to be contained in the aforesaid transparent protective layer to impart a fine undulating structure on the surface.

The fine particles to be contained in the aforesaid transparent protective film may be, for example, suitable transparent particles such as inorganic fine particles made of silica, alumina, titania, zirconia, tin oxide, indium oxide, cadmium oxide, antimony oxide, or the like having an average particle size of from 0.5 to 50 $\mu$m, which may be electrically conductive, or organic fine particles made of a cross-linked or non-cross-linked polymer or the like.

On the other hand, the reflecting type polarizing plate is for forming a liquid crystal display or the like of a type such that the incident light from the viewing side (display side) is reflected for display. This has an advantage in that the incorporation of a light source such as a backlight can be omitted to facilitate fabrication of a liquid crystal display having a reduced thickness.

The reflecting type polarizing plate may be formed by a suitable method such as a method of attaching a reflecting layer made of metal or the like onto one surface of a polarizing film, optionally via a transparent protective layer or the like. A specific example of the reflecting type polarizing plate may be one in which a foil or a vapor-deposited film made of a reflecting metal such as aluminum is attached onto one surface of a transparent protective layer made of an optionally matted film or the like. Also, the reflecting type polarizing plate may be one having a reflecting layer of a fine undulating structure on the aforesaid diffusing type transparent protective layer.

The aforesaid reflecting layer having a fine undulating structure has advantages such as preventing directivity or glittering appearance by diffusing the incident light by random reflection, thereby restraining the unevenness of brightness. The reflecting layer of a fine undulating structure reflecting the surface fine undulating structure of the transparent protective layer can be formed, for example, by attaching metal directly onto the surface of a transparent protective layer with the use of a suitable method of vapor deposition type such as the vacuum vapor deposition method, the ion plating method, or the sputtering method or plating type or the like.

In the present invention, a brightness enhanced plate 3 or a retardation plate 7 are bonded and laminated on one side or on both sides of the aforesaid polarizing plate via adhesive layers 2, 6, as illustrated in the drawings. The brightness enhanced plate is sometimes referred to as polarizing separating plate, and shows such a property that, when natural light is incident, a linearly polarized light of a predetermined polarizing axis or a circular polarized light in a predetermined direction is reflected, and the other light is transmitted. The brightness enhanced plate is used for the purpose of improving brightness in a liquid crystal display.

Namely, the brightness enhanced plate is used for the purpose of improving brightness by using a method such as allowing light from a light source such as a backlight to be incident into the brightness enhanced plate so as to obtain a transmitted light in a predetermined polarized state, and allowing the reflected light to be reversed via a reflecting layer or the like to be incident into the brightness enhanced plate again, and allowing all or part thereof to be transmitted as a light in a predetermined polarized state so as to increase the amount of light transmitted through the brightness enhanced plate as well as supplying a polarized light that is hardly absorbed by a polarizing plate so as to increase the amount of light that can be used for liquid crystal display or the like.

Therefore, as the brightness enhanced plate can be used a suitable plate, for example, that shows a property of transmitting a linearly polarized light of a predetermined polarizing axis and reflecting the other light, such as a multi-layer thin film of dielectrics or a multi-layer laminate of thin films having different refractive index anisotropies (D-BEF and others manufactured by 3M Co., Ltd.), or that shows a property of reflecting one of right and left circular polarized lights and transmitting the other light, such as a cholesteric liquid crystal layer, particularly an oriented film of cholesteric liquid crystal polymer or one in which the oriented liquid crystal layer is supported on a film base material (PCF350 manufactured by NITTO DENKO CORPORATION, Transmax manufactured by Merck Co., Ltd., and others).

In the aforesaid brightness enhanced plate of a type that transmits a linearly polarized light of a predetermined polarizing axis, the light can be efficiently transmitted while restraining the absorption loss by the polarizing plate, by allowing the transmitted light to be incident, as it is, into the polarizing plate with aligned polarized axis.

On the other hand, in the brightness enhanced plate of a type that transmits a circular polarized light, such as a cholesteric liquid crystal layer, it is preferable to allow the light to be incident into the polarizing plate after converting the transmitted circular polarized light into a linearly polarized light via a retardation plate instead of allowing the light to be incident, as it is, into the polarizing plate to restrain the absorption loss. The circular polarized light can be converted into a linearly polarized light by using a quarter wavelength plate as the retardation plate and disposing the plate between the polarizing plate and the brightness enhanced plate.

A retardation plate that functions as a quarter wavelength plate in a wide wavelength range such as a visible light region can be obtained by a method such as superposing a retardation layer that functions as a quarter wavelength plate to a monochroic light such as a 550 nm wavelength light, onto a retardation layer that shows a different retardation characteristics, for example, a retardation layer that functions as a half wavelength plate. Therefore, the retardation plate to be disposed between the polarizing plate and the brightness enhanced plate may be made of one or more layers of retardation layers.

Also, as to the cholesteric liquid crystal layer, one can obtain a layer that reflects a circular polarized light in a wide wavelength range such as a visible light region by providing a configuration structure in which two or more layers are superposed using a combination of layers having different reflection wavelengths.

On the other hand, the retardation plate to be bonded and laminated on one side or on both sides of the polarizing plate via an adhesive layer is used for the purpose of further enhancing the precision of optical compensation in addition to the aforesaid compensating plate, or for the purpose of controlling a suitable retardation such as converting circular polarized light into linearly polarized light or converting linearly polarized light into circular polarized light. Therefore, as the retardation plate, one can use a suitable plate similar to the aforesaid compensating plate in accordance with an intended retardation and the like.

One or more layers of a suitable combination of one or both of the brightness enhanced plate or the retardation plate can be bonded and laminated on one side or on both sides of the polarizing plate via an adhesive layer, and the disposal position can be suitably determined in accordance with the intended purpose of use. Generally, one or more layers of brightness enhanced plate 3 are provided in such a manner that the polarizing plate can be disposed between the brightness enhanced plate and the liquid crystal cell, and one or more layers of retardation plate 7 for optical compensation are disposed in such a manner as to be capable of being disposed between the polarizing plate 1 and the liquid crystal cell, as illustrated in the drawings. Also, one or more layers of retardation plate that aims at converting a circular polarized light into a linearly polarized light are disposed between the brightness enhanced plate 3 and the polarizing plate 1.

As illustrated in the drawings, the adhesive layers 4, 8 disposed on one surface or on both surfaces of the laminate is for bonding and fixing the wide viewing angle polarizing plate onto another member such as a liquid crystal cell. In the present invention, the adhesive layers 4, 8 as well as the adhesive layers 2, 6 located inside the laminate for bonding and laminating the aforesaid polarizing plate and brightness enhanced plate and/or retardation plate, are all formed from materials having a 1000% modulus at 90° C. (tensile speed of 300 mm/min, the same will apply hereafter) of at most 6 g/mm$^2$.

If the 1000% modulus at 90° C. of the aforesaid adhesive layer exceeds 6 g/mm$^2$, brightness unevenness is liable to occur when the wide viewing angle polarizing plate is bonded and fixed onto a liquid crystal cell or the like and subjected to a heating process. In view of preventing the occurrence of brightness unevenness by heat history, the 1000% modulus at 90° C. of the adhesive layer is preferably within a range from 2.0 to 5.5 g/mm$^2$, more preferably within a range from 2.5 to 5.0 g/mm$_2$.

For forming the adhesive layer, a suitable adhesive exhibiting the aforesaid modulus property can be used. An example thereof is an adhesive being excellent in optical transparency and exhibiting adhesive characteristics of suitable wettability, cohesiveness, and adhesiveness, for example, an adhesive made by using a suitable polymer such as an acryl series polymer, a silicone series polymer, polyester, polyurethane, polyether, or synthetic rubber as a base polymer. In particular, an adhesive made of an acryl series polymer is excellent in transparency, weather resistance, heat resistance, and others, and is preferable for use.

An example of the aforesaid acrylic series polymer is one that uses one or more kinds of acrylic acid ester or methacrylic acid ester having a glass transition temperature of at most −10° C. as a monomer constituting a major component that exhibits a suitable wettability and softness. As the ester, one can suitably use an acrylate or methacrylate having an organic group made of an alkyl group with a carbon number of 4 or more, particularly from 4 to 24, such as n-butyl, isobutyl, isoamyl, hexyl, heptyl, cyclohexyl, 2-ethylhexyl, isooctyl, isononyl, lauryl, dodecyl, isomyristyl, or octadecyl, in view of adjustability or the like of modulus and adhesive strength.

The aforesaid acrylic series polymer may contain a monomer for reforming the cohesiveness and adhesiveness as an adhesive, or for imparting a cross-linking reaction property, as a copolymerization component. The monomer for copolymerization is not particularly limited, and may be copolymerizable with the aforesaid monomer constituting the major component. The monomer involved in intermolecular cross-linking by having a functional group capable of reacting with the aforesaid intermolecular cross-linking agent is in most cases subjected to copolymerization.

Examples of the monomer having a functional group and used for copolymerization include carboxyl group containing monomers such as acrylic acid, methacrylic acid, carboxyethyl acrylate, carboxypentyl acrylate, itaconic acid, maleic acid, and crotonic acid; hydroxyl group containing monomers such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, and (4-hydroxymethylcyclohexyl)-methyl acrylate; acid anhydride monomers such as maleic anhydride, and itaconic anhydride; epoxy group containing monomers such as glycidyl (meth)acrylate; and alkoxy group containing monomers such as trimethoxysilylpropyl acrylate. Such a monomer having a functional group is used typically in a copolymerization ratio of at most about 2 wt %, though it depends on the kind of the aforesaid major component monomer.

Examples of other monomers for copolymerization, which are intended for reforming the cohesiveness, adhesiveness, modulus, and others include sulfonic group containing monomers such as 2-acrylamide-2-methylpropanesulfonic acid; phosphoric group containing monomers such as 2-hydroxyethylacryloyl phosphate; amide series monomers such as (meth)acrylamide, N-acryloylmorpholine, and N-substituted (meth) acrylamide; maleimide series monomers such as N-cyclohexylmaleimide, N-isopropylmaleimide, N-laurylmaleimide, and N-phenylmaleimide; itaconimide series monomers such as N-methylitaconimide, N-ethylitaconimide, N-butylitaconimide, N-octylitaconimide, N-2-ethylhexylitaconimide, N-cyclohexylitaconimide, N-laurylitaconimide; and succinimide series monomers such as N-(meth)acryloyloxymethylenesuccinimide, N-(meth)acryloyl-6-oxyhexamethylenesuccinimide, and N-(meth)acryloyl-8-oxyoctamethylenesuccinimide.

Further, vinyl series monomers such as vinyl acetate, N-vinylpyrrolidone, N-vinylcarboxylic acid amide series, and styrene; divinyl series monomers such as divinyl benzene; diacrylate series monomers such as 1,4-butyl diacrylate and 1,6-hexyl diacrylate; acrylate series monomers such as tetrahydrofurfuryl (meth)acrylate, polyethylene glycol (meth)acrylate, polypropylene glycol (meth)acrylate, fluorinated (meth)acrylate, and silicone (meth)acrylate; (meth) acrylate having a low ester group such as methyl, ethyl, or propyl, which are different from the aforesaid major component monomers; and others can be mentioned as monomers for copolymerization.

On the other hand, multifunctional acrylate series monomers and others can also be used as monomers for copolymerization in accordance with the needs, for example, in the case of carrying out a cross-linking process by a post-cross-linking operation without addition of a cross-linking agent by radiation of radioactive rays such as electron beams. Examples of such monomers include hexanediol di(meth) acrylate, (poly)ethylene glycol di(meth)acrylate, (poly) propylene glycol di(meth)acrylate, neopentyl glycol di(meth)acrylate, pentaerythritol di(meth)acrylate, trimethylolpropane tri(meth)acrylate, pentaerythritol tri(meth) acrylate, dipentaerythritol hexa(meth)acrylate, epoxy acrylate, polyester acrylate, and urethane acrylate.

For the preparation of acryl series polymers, a suitable method such as the solution polymerization method, the emulsion polymerization method, the bulk polymerization method, or the suspension polymerization method can be applied to a mixture of one or more kinds of monomers, and also the bulk polymerization method of an ultraviolet radiation method can be applied. The weight average molecular weight of the acryl series polymers can be suitably determined; it is typically at least 400,000, preferably from 800,000 to 4,000,000, more preferably from 1,000,000 to 3,000,000.

For the intermolecular cross-linking agent that can be used in an optional cross-linking treatment of the adhesive layers, a suitable one such as a multifunctional isocyanate series cross-linking agent, an epoxy series cross-linking agent, a melamine resin series cross-linking agent, a metal salt series cross-linking agent, a metal chelate series cross-linking agent, or an amino resin series cross-linking agent can be used in accordance with the functional group introduced into the adhesive. The blending amount thereof can be suitably determined from the viewpoint of achievability of the aforesaid modulus; it is typically from 0.01 to 20 parts by weight, preferably from 0.1 to 15 parts by weight, more preferably from 0.2 to 10 parts by weight with respect to 100 parts by weight of the base polymer.

The modulus in the adhesive layer can be controlled by a method similar to the conventional one, such as composition of the polymer, molecular weight, cross-linking method, cross-linking degree, or addition of an optional component. Therefore, suitable additives such as natural and synthetic resins, glass fibers, glass beads, fillers and pigments made of metal powders, other inorganic powders, and the like, coloring agents, and antioxidants, which may be added to the adhesive layers, can be blended in accordance with the needs within a range that satisfies the above predetermined modulus. Further, an adhesive layer exhibiting an optical diffusion property can be made by allowing fine particles to be contained therein.

The adhesive strength of the adhesive layer can be suitably set, the adhesive strength is typically at most 3 kg/20 mm, preferably at most 2 kg/20 mm, more preferably from 0.1 to 1 kg/20 mm, in terms of 90°-peeling adhesive strength (peeling speed: 100 mm/min, 25° C.) to an adherend made of glass plate, plastic film, or the like. The adhesive strength is preferably at most 600 g/20 mm, more preferably at most 400 g/20 mm, in view of peeling without damaging the liquid crystal cell at the time of adhesion mistake.

The attachment of adhesive layers onto one surface or onto both surfaces of the polarizing plate, brightness enhanced plate, retardation plate, and laminate thereof can be carried out by a suitable method. Example of the method include a method of preparing an adhesive solution of from 10 to 40 wt % by dissolving or dispersing an adhesive into a solvent made of a single or a mixture of suitable solvents such as toluene and ethyl acetate, and attaching the adhesive solution directly onto the polarizing plate, the laminate, or the like by a suitable developing method such as the casting method or the application method, and a method of forming an adhesive layer on a separator in accordance with the above and transferring the adhesive layer onto the polarizing plate, the laminate, or the like.

The adhesive layer can also be provided on one surface or on both surfaces of the polarizing plate, the laminate, or the like as superposed layers of those of different kinds or those having different compositions. If the adhesive layer is to be provided on both surfaces, adhesive layers of different kinds or having different compositions can be provided on the front side and on the rear side of the polarizing plate, the laminate, or the like. The thickness of the adhesive layer can be suitably determined in accordance with the adherend or the like, and is typically from 1 to 500 μm. In view of restraining the occurrence of brightness unevenness, the adhesive layer (4, 8) on the outer surface of the laminate preferably has a larger thickness than the adhesive layer (2, 6) inside the laminate, more preferably by at least 10%, still more preferably by two times or more.

For preventing decrease in the adhesive strength by contamination or the like, a separator 5 or the like is provisionally attached onto the adhesive layers 4, 8 exposed on the surface for covering in accordance with the needs until the adhesive layers are subjected to bonding, as illustrated in the drawings. The separator may be a suitable one known in the art, which is obtained by performing a coating process on a suitable thin foliate such as polymer film, rubber sheet, paper, cloth, nonwoven cloth, net, foamed sheet, metal foil, or a laminate body thereof with a suitable release agent such as silicone series, long-chain alkyl series, or fluorine series.

The polarizing film, the transparent protective layer, the compensating plate, the brightness enhanced plate, the retardation plate, the adhesive layer or the tacky layer constituting the wide viewing angle polarizing plate may be allowed to have an ultraviolet absorbing capability by a method of treating with a ultraviolet absorber such as a salicylic acid ester series compound, a benzophenol series compound, a benzotriazol series compound, a cyanoacrylate series compound, or a nickel complex salt series compound.

The wide viewing angle polarizing plate according to the present invention is constructed in such a manner that a transparent protective layer such as an compensating plate, a brightness enhanced plate and/or a retardation plate is bonded in advance onto a polarizing film for the purpose of preventing occurrence of variation in quality or improving the efficiency of assembling the liquid crystal display, or the like purpose. In bonding the compensating plate and the like onto the polarizing film, a configuration angle with a suitable optical axis can be adopted in accordance with the intended retardation characteristics and the like.

The wide viewing angle polarizing plate of the present invention can be used for a suitable purpose such as formation of a liquid crystal display. Bonding and fixing a wide viewing angle polarizing plate onto one side or on both sides of a liquid crystal cell via the adhesive layer of the polarizing plate can form a liquid crystal display. The other points are similar to those in the prior art.

Namely, suitably assembling a liquid crystal cell and a wide viewing angle polarizing plate together with optional construction components such as an illumination system and incorporating a driving circuit form a liquid crystal display typically. In the present invention, there is no particular limitation except that the wide viewing angle polarizing plate of the present invention is used, so that a conventional process can be carried out.

Therefore, one can form a suitable liquid crystal display such as one in which a polarizing plate is disposed on one side or on both sides of a liquid crystal cell or one in which a backlight or a reflector is used in an illumination system. In this case, the wide viewing angle polarizing plate of the present invention can be bonded and fixed onto one side or onto both sides of the liquid crystal cell. Also, with respect to the liquid crystal cell, those of arbitrary types such as TN type, STN type, and π type can be used.

In bonding and fixing the aforesaid wide viewing angle polarizing plate, the process is carried out so that the polarizing plate, the compensating plate, and others may be located to form a predetermined configuration, the configuration may be a conventional one. Typically, in view of the compensation effect, it is preferable to locate the compensating plate between the polarizing film and the liquid crystal cell, and to dispose the wide viewing angle polarizing plate at least on the viewing side of the liquid crystal cell. A wide viewing angle polarizing plate using a brightness enhanced plate is disposed typically on the light source side of the backlight or the like.

In forming a liquid crystal display, one or more layers of suitable optical layers such as a diffusing plate, an antiglare phase, a reflection preventing film, a protecting plate, a reflector, and a semitransparent reflector can be disposed at suitable locations to form liquid crystal displays of various types such as reflecting type, transmitting type, and reflecting and transmitting type serving for both purposes.

The aforesaid optical layers can be used also in a state of being bonded and integrated in advance with a wide viewing angle polarizing plate via an adhesive layer or the like. Namely, such an optical layer can be disposed by a method of successive or separate lamination in a process of producing a liquid crystal display. If the optical layer is used by being bonded and integrated in advance with a wide viewing angle polarizing plate, it will be excellent in the stability of quality and the operability of lamination, thereby providing an advantage of improving the efficiency of producing the liquid crystal display. In this case, an adhesive layer satisfying the aforesaid 1000% modulus can be preferably used in view of restraining the brightness unevenness.

EXAMPLES

Example 1

A cellulose triacetate film was bonded, via a polyvinyl alcohol series adhesive layer, onto one side of a polarizing film obtained by stretching a polyvinyl alcohol film having a thickness of 80 μm fivefold in an aqueous solution of iodine, and an compensating plate was bonded onto the other side via a polyvinyl alcohol series adhesive layer. Subsequently, a brightness enhanced plate (PCF350 manufactured by NITTO DENKO CORPORATION) was bonded onto the cellulose triacetate film via an acryl series adhesive A having a thickness of 25 μm and a 1000% modulus at 90° C. of 3.8 g/mm$^2$. Then, an acryl series adhesive layer B having a thickness of 25 μm and a 1000% modulus at 90° C. of 3.8 g/mm$^2$ provided on a separator was transferred to an exposed surface of the aforesaid compensating plate, thereby giving a wide viewing angle polarizing plate.

The aforesaid compensating plate is one in which an compensating layer formed by inclined orientation of a discotic liquid crystal polymer is supported with a cellulose triacetate film (WV A02A manufactured by Fuji Photo Film Co., Ltd.)

Further, the adhesive layers were formed by applying an acryl series adhesive, which is obtained by blending 0.1 part by weight of trimethylolpropanetrilene diisocyanate and 0.1 part by weight of γ-glycidoxypropylmethoxysilane with 100 parts by weight of an acryl series copolymer having a weight average molecular weight of 1,940,000 and produced by using 99.8 parts by weight of isooctyl acrylate, 0.2 part by weight of 6-hydroxyhexyl acrylate, and 0.3 part by weight of 2,2'-azobisisobutylnitrile, onto a separator made of a polyester film, followed by a heating treatment at 150° C. for 5 minutes.

The modulus of the adhesive layers was measured by laminating the adhesive layers so as to have a thickness of 1 mm, cutting the laminate into a size of 5 mm×10 mm, and applying it to a tensile test apparatus (autograph AG2000-A manufactured by Shimadzu Corporation) to determine a stress-strain curve at 90° C. under a condition with a tensile speed of 300 mm/min and a chucking interval of 10 mm, and determining the stress at 1000% strain (the same will apply hereafter).

Example 2

A wide viewing angle polarizing plate was produced in the same manner as in Example 1 except that the thickness of the adhesive layer B provided on the compensating plate was set to be 28 μm.

Example 3

A wide viewing angle polarizing plate was produced in the same manner as in Example 1 except that the thickness of the adhesive layer A for bonding the brightness enhanced plate was set to be 15 μm and that the thickness of the adhesive layer provided on the compensating plate was set to be 35 μm.

Example 4

A wide viewing angle polarizing plate was produced in the same manner as in Example 1 except that an acryl series adhesive layer having a 1000% modulus at 90° C. of 30 g/mm² was used as the adhesive layer B provided on the compensating plate.

Example 5

A wide viewing angle polarizing plate was produced in the same manner as in Example 1 except that an acryl series adhesive layer having a 1000% modulus at 90° C. of 30 g/mm² was used as the adhesive layer A for bonding the brightness enhanced plate.

Example 6

A wide viewing angle polarizing plate was produced in the same manner as in Example 1 except that an acryl series adhesive layer having a 1000% modulus at 90° C. of 30 g/mm² was used as the adhesive layer A for bonding the brightness enhanced plate and as the adhesive layer B provided on the compensating plate.

A sample was cut out in a size of 200 mm×150 mm from each of the wide viewing angle polarizing plates obtained in Examples 1 to 6 so that the sample would form an angle of 45° with respect to the absorption axis of the polarizing film, and the sample was bonded and fixed onto a glass plate having a thickness of 1.1 mm (with each side larger by 10 mm) via the adhesive layer on the compensating plate side in the wide viewing angle polarizing plate. Also, a polarizing plate similar to the above one but in a state in which the brightness enhanced plate and the bonding layer for bonding it are absent, was bonded and fixed onto the other surface of the glass plate so that the front side and the rear side would form crossed Nicols. After the obtained product was left to stand in an atmosphere of 60° C. for 24 hours, the optical transmittance thereof was examined. The locations of measurement were nine points in all, including four corners of the sample, four points in the middle thereof, and the center. The difference between the maximum transmittance and the minimum transmittance was determined. This represents the variation of retardation.

The results of the above are shown in the following Table.

TABLE

| | 1000% modulus (g/mm²) | | thickness (μm) | | optical transmittance difference (%) |
|---|---|---|---|---|---|
| | adhesive layer A | adhesive layer B | adhesive layer A | adhesive layer B | |
| Example 1 | 3.8 | 3.8 | 25 | 25 | 0.04 |
| Example 2 | 3.8 | 3.8 | 25 | 28 | 0.03 |
| Example 3 | 3.8 | 3.8 | 15 | 35 | 0.01 |
| Comparative Example 4 | 3.8 | 30 | 25 | 25 | 0.07 |
| Comparative Example 5 | 30 | 3.8 | 25 | 25 | 0.06 |
| Comparative Example 6 | 30 | 30 | 25 | 25 | 0.10 |

The above Table shows that, by controlling the 1000% modulus of the adhesive layers, the variation of retardation by heat history can be restrained, thereby restraining the brightness unevenness, particularly those generated in a window frame shape. It is also shown that, by controlling the thickness of the adhesive layers, the brightness unevenness can be further restrained.

What is claimed is:

1. A wide viewing angle polarizing plate comprising:
   a polarizing plate in which a transparent protective layer made of a compensating plate is provided on at least one surface of a polarizing film;
   one or both of a brightness enhanced plate and a retardation plate laminated on the polarizing plate via an adhesive layer thereby to form a laminate; and
   an adhesive layer disposed on one surface or on both surfaces of an outer surface of the laminate,
   wherein said adhesive layers all have a 1000% modulus at 90° C. of at most 6 g/cm².

2. The wide viewing angle polarizing plate according to claim 1, wherein the compensating plate is a liquid crystal layer supported by a film.

3. The wide viewing angle polarizing plate according to claim 1, wherein the polarizing plate is provided in such a manner as to be disposed between the brightness enhanced plate and the adhesive layer on the outer surface.

4. The wide viewing angle polarizing plate according to claim 1, wherein the retardation plate is provided in such a manner as to be disposed between the polarizing plate and the adhesive layer on the outer surface.

5. The wide viewing angle polarizing plate according to claim 1, wherein the adhesive layer provided on the outer surface of the laminate has a larger thickness than the adhesive layer disposed inside the laminate.

6. A liquid crystal display having a wide viewing angle polarizing plate of claim 1 on at least one side of a liquid crystal cell.

7. A polarizing layer having a wide viewing angle, adapted to be attached to a surface of a liquid crystal cell, comprising:
   a polarizing plate comprising: (i) a polarizing film and (ii) a transparent protective layer made of a compensating plate, said transparent protective layer being formed on at least one side of the polarizing film;
   a first adhesive layer disposed on one side of the polarizing plate;
   one of a brightness enhanced plate or a retardation plate, which is laminated on the side of the polarizing plate via the adhesive layer; and
   a second adhesive layer disposed on one of the other side of the polarizing plate or the side on which the brightness enhanced plate or the retardation plate is laminated, said second adhesive layer being adapted to be attached to an outward layer, wherein said adhesive layers have a 1000% modulus at 90° C. of at most 6 g/cm².

8. The polarizing layer according to claim 7, wherein the second adhesive layer has a higher thickness than the first adhesive layer.

9. A method of widening a viewing angle of a polarizing layer adapted to be attached to a surface of a liquid crystal cell, said polarizing layer comprising: (a) a polarizing plate, (b) a first adhesive layer disposed on one side of the polarizing plate; (c) one of a brightness enhanced plate or a retardation plate, which is laminated on the side of the polarizing plate via the adhesive layer; and (d) a second adhesive layer disposed on one of the other side of the polarizing plate or the side on which the brightness enhanced plate or the retardation plate is laminated, wherein the second adhesive layer is adapted to be attached to an outward layer, said method comprising adjusting a 1000% modulus at 90° C. to 6 g/cm² or lower by selecting an adhesive disposed as the first and second adhesive layers.

10. The method according to claim 9, further comprising rendering the thickness of the second adhesive layer higher than that of the first adhesive layer.

* * * * *